2,961,413

REACTIVATION OF ACTIVATED CARBON USED TO PURIFY WASTE AIR

Hans Georg Wendlandt, Kassel-Bettenhausen, and Lothar Henrich, Wuppertal-Cronenberg, Germany, assignors to Spinnfaser Aktiengesellschaft, Kassel-Bettenhausen, Germany No Drawing. Filed Oct. 28, 1957, Ser. No. 692,568

Claims priority, application Germany Oct. 31, 1956

2 Claims. (Cl. 252—414)

This invention in general relates to processes for reactivation of activated carbon which has been employed in the recovery of carbon disulfide.

In the recovery of carbon disulfide from outgoing air, as, for example, from the outgoing air of viscose factories, the activated carbon process is effectively employed. This process can be carried out without difficulties, if the hydrogen sulfide is previously removed except for slight residues. This is necessary in order to prevent oxidation products of the hydrogen sulfide from being deposited on the activated carbon through the oxidation of the hydrogen sulfide, which products reduce the sorption capacity of the sorbents for the carbon disulfide.

It has been established that, despite virtually quantitative removal of the $H_2S$ from the outgoing air, the formation of further sulfur compounds on the carbon cannot be prevented, so that the efficiency of the installation constantly falls. The reason for this is found in the instability of the carbon disulfide. Under the conditions of the process, carbon disulfide is converted in part with water vapor into hydrogen sulfide and carbon dioxide in accordance with the following equation.

$$CS_2 + 2H_2O \rightarrow 2H_2S + CO_2$$

This reaction is catalytically favored by the activated carbon. Even with the most favorable conditions of operation, it is always necessary to count on the decomposition of a certain proportion of the carbon disulfide recovered from the outgoing air. The hydrogen sulfide arising in this reaction is oxidized to sulfuric acid and sulfur, in which process the sulfuric acid predominates:

(1) $2H_2S + 3O_2 \rightarrow 2SO_2 + 2H_2O$
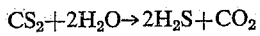
(2) $2SO_2 + O_2 \rightarrow 2SO_3$
(3) $(SO_3 + H_2O \rightarrow H_2SO_4)$
(4) $SO_2 + 2H_2S \rightarrow 3S + 2H_2O$ While the removal of the sulfuric acid can be accomplished relatively simply by washing out with water, the disposal of the elementary sulfur is much more difficult.

The rise in the sulfur concentration of the active carbon is not proportional to the quantity of sulfur formed, since a small part of the sulfur situated on the carbon can be dissolved out over and over again in the carbon disulfide desorption. It is apparent that the quantity of sulfur thus removed grows with increasing sulfur content of the activated carbon. However, a state of equilibrium cannot be maintained at which the quantity of the sulfur formed corresponds to the quantity of sulfur dissolved out in the desorption of the carbon disulfide. Experience shows, rather, that the quantity of sulfur formed becomes larger in the course of time than the amount automatically dissolved out, so that it is necessary to remove the carbon charged with sulfur after the exceeding of a limit concentration. The processes that have hitherto been used for the removal of the deposited sulfur from the carbon had the great drawback that they employed solvents which secondarily brought about an adverse effect on the activity of the carbon, and these methods of regeneration have gone out of use. Aqueous solutions of ammonium sulfide or sodium sulfide were among the aforesaid solvents used for the desulfurization of the carbon.

In these processes a procedure was followed such that the solution was applied to the carbon, in which process the greater part of the sulfur present was absorbed and thus removed from the carbon. The wash solution, enriched with sulfur, was run off and discarded. An attempt was then made to remove the solvent by washing out the carbon with water, but, because of the activity of the carbon, this could not be carried out adequately. There remained, therefore, in the capillary system of the carbon, certain parts of the solvent, whose cationically active components brought about a damaging of the adsorptive properties of the active carbon. In the final result, it was always a question of economy—whether the inadequate cleansing process was to be used or whether the carbon was to be discarded after the reaching of a certain degree of contamination.

The difficulties would, however, be possible to overcome, if, for the removal of the sulfur, a solvent could be used which had a high solvent capacity for sulfur, but which contained none of the components which damage the carbon. The use of carbon disulfide, which, as is well known, is a good solvent for sulfur, was hitherto not taken into consideration because the activated carbon adsorbs carbon disulfide only with the liberation of large amounts of heat. It was necessary, therefore, to reckon with the fact that in the washing out of the sulfur deposits from the activated carbon by means of carbon disulfide, such considerable amounts of heat are liberated that it is necessary to cope with the danger of explosion in operation.

Surprisingly, however, it was found in accordance with our invention that the activated carbon charged with carbon disulfide during the sorption process can be rinsed with liquid carbon disulfide for the removal of the sulfur contained in it without the occurrence of appreciable heat.

The process can be most simply carried out in such a way that, after the completion of the normal charge of the activated carbon with carbon disulfide in the outgoing air stream, the adsorber is supplied with outside air in order to put the activated carbon layer at a mean temperature of approximately 35° C.

The adsorber is then washed with inert gas to expel the air, and liquid carbon disulfide is brought into contact with the activated carbon in an amount such that about two-thirds of the activated carbon is covered with carbon disulfide.

After a retention period of half an hour up to two hours, the dissolving process is concluded. Thereupon, the carbon disulfide is drawn off. It contains the dissolved sulfur. After a subsequent distillation, the carbon disulfide is then available for further operations.

A certain part of the carbon disulfide used for sulfur removal remains in the carbon, which part is not removed by draining thereof. This carbon disulfide, however—amounting to about 20 to 30% of the quantity employed—is not lost, but is recovered in the following stage of the process, by desorption, in which steam is sent downwards through the activated carbon and the mixture of steam and $CS_2$ resulting is precipitated by condensation. The carbon disulfide is then separated and removed for reuse.

It is, however, also possible to carry out the removal of the sulfur after the carbon, following the normal charging with carbon disulfide, is freed of carbon disulfide in the usual manner by washing with steam and, by drying with hot air and cooling with outside air, is brought into the normal operating condition. The air is displaced by inert gas, and liquid carbon disulfide is introduced to such an extent that two-thirds of the activated carbon layer is covered with carbon disulfide. The further processing follows the procedure described above.

The removal of the sulfur from the active carbon by the proposed carbon disulfide washing may, if desired, be coordinated with the removal of the sulfuric acid at regular intervals of 4 to 6 weeks. This removal of sulfuric acid is accomplished in such a way that the activated carbon is rinsed a number of times with water. In the process, the sulfuric acid is dissolved out. After completion of this rinsing, the carbon must be dried, and this is accomplished with hot air. It is then possible to combine the removal of the sulfur with the sulfuric acid removal in such a way that after the last rinsing with water—that is, after the draining off of the last batch of wash water—the air that is still present in the adsorber is removed through displacement by means of inert gas. The liquid carbon disulfide is then introduced until two-thirds of the activated carbon is covered with carbon disulfide. The further processing ensues in the usual manner. Obviously, in this form of execution of the process of the invention, the degree of efficiency is to a certain extent impaired by the water contained in the carbon.

According to the operational methods known hitherto, the procedure was such that the activated carbon was left in operation until the complete exhaustion of its activity and then discarded. According to the process of the invention it is best to proceed in such a way that the cleansing process by means of carbon disulfide is interposed when the carbon has adsorbed approximately 20% of sulfur. At this sulfur level, the carbon is still usable, but it has proved advantageous not to let the sulfur content rise any higher. An activated carbon cleansed at intervals of 10 to 12 weeks by the process of the invention remains usable over a very long period of operation and thereby heightens remarkably the economy of the process.

It is obvious that the process is not limited to a removal of the sulfur from the activated carbon inside the adsorber. Undoubtedly, an essential advantage is to be seen in the fact that the cleansing is accomplished inside the adsorber itself, but it must not be forgotten that the important point is to maintain the activity of the carbon as long as possible. This can be accomplished, likewise, in a thoroughly satisfactory manner if the carbon is removed from the adsorber and the cleansing is undertaken in a separate regeneration chamber. Such a procedure would be advantageous where the adsorber has a large dead space below the carbon layer, which space would have to be filled for the effective execution of the process with carbon disulfide. Since, especially in large installations, after a certain period of operation, the carbon must be subjected to a sifting, the regeneration process can be accomplished in connection with these operations. The sifting is necessary in order to remove the slack coal deposited by mechanical abrasion of the individual carbon particles. After this operation, the carbon is transferred to an extraction chamber, and the washing with carbon disulfide is accomplished in the manner described above.

The invention will be further understood from the following specific example, but the invention is not limited thereto.

*Example*

A body of activated carbon which was employed in an adsorption vessel to remove carbon disulfide from exhaust air at a viscose plant was cooled with air to a mean temperature of approximately 35° C. The activated carbon contained about 20% by weight of elemental sulfur. The adsorber was then washed with nitrogen to expel the air, and liquid carbon disulfide introduced into the vessel until about two-thirds of the activated carbon was covered with carbon disulfide. After a retention period of about one hour, the carbon disulfide was drained off. The carbon disulfide was then purified of the dissolved sulfur by distillation thereof.

The carbon disulfide retained by the activated carbon after the draining off of the carbon disulfide was recovered by passing steam downwardly through the body of activated carbon. This desorption step precipitated a mixture of steam and carbon disulfide. The carbon disulfide was then separated from the condensed steam.

It is obvious from the foregoing description that the process of the invention may be carried out in a number of ways and at various stages in the overall operation. Other modifications and variations of the invention defined in the appended claims will occur to those skilled in the art without departing from the spirit and scope of the invention.

The invention is hereby claimed as follows:

1. A process for removal of sulfur from activated carbon particles which have lost a significant amount of their sorption capacity for carbon disulfide vapors by contamination of the activated carbon particles with elemental sulfur formed by the oxidation of hydrogen sulfide in waste air which has been purified of carbon disulfide by said activated carbon, which process comprises displacing air between dry activated carbon particles containing said elemental sulfur with an inert gas when said particles are at a mean temperature of about 35° C., washing the activated carbon particles to remove elemental sulfur therefrom by wetting said particles from which air has been displaced with liquid carbon disulfide for a period of at least about one-half hour, draining off the excess carbon disulfide from said particles, and treating said drained particles with steam to remove the residual carbon disulfide.

2. The process of claim 1 wherein the activated carbon particles are wetted with carbon disulfide by covering about ⅔ of the body of activated carbon particles with carbon disulfide.

References Cited in the file of this patent
UNITED STATES PATENTS

| | | |
|---|---|---|
| 2,589,750 | Van Nouhuys | Mar. 18, 1952 |
| 2,769,751 | Paull | Nov. 6, 1956 |

OTHER REFERENCES

Mellor: "Comprehensive Treaties on Inorganic and Theoretical Chemistry," Longmans, Green & Co., N.Y., 1930, vol. X, page 96.